(12) United States Patent
    Alsayegh et al.

(10) Patent No.: US 12,644,165 B1
(45) Date of Patent: Jun. 2, 2026

---

(54) ALUMINUM ALLOY-BASED EFFERVESCENT TABLET FOR PRODUCING ENHANCED HEAT TRANSFER SUSPENSIONS

(71) Applicant: KUWAIT UNIVERSITY, Safat (KW)

(72) Inventors: Naser Alsayegh, Safat (KW); Nawaf F. Aljuwayhel, Safat (KW); Husain Ashkanani, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 19/304,774

(22) Filed: Aug. 20, 2025

(51) Int. Cl.
    *C22B 21/00*     (2006.01)
    *B82Y 40/00*     (2011.01)
    *C22B 1/24*     (2006.01)
    *C22B 9/16*     (2006.01)
    *C22B 21/06*     (2006.01)

(52) U.S. Cl.
    CPC .......... *C22B 21/0069* (2013.01); *B82Y 40/00* (2013.01); *C22B 1/24* (2013.01); *C22B 9/16* (2013.01); *C22B 21/0092* (2013.01); *C22B 21/06* (2013.01); *Y02W 30/52* (2015.05); *Y02W 30/80* (2015.05)

(58) Field of Classification Search
    CPC ......... C22B 9/16; C22B 21/0069; C22B 1/24; C22B 21/0092; C22B 21/06; B82Y 40/00; Y02W 30/80; Y02W 30/52
    See application file for complete search history.

(56) References Cited

U.S. PATENT DOCUMENTS 12,129,173 B2 * 10/2024 Alsayegh .................. C01B 3/08

FOREIGN PATENT DOCUMENTS

CN         113430058 A * 9/2021 ............. C11D 3/044
IN         201621010223 A   5/2016

OTHER PUBLICATIONS

Conventional Powder Metallurgy Aluminum and Aluminum Alloys ASM Handbook p. 581-588 vol. 7 Powder Metallurgy (Year: 2015).*
Powder Metallurgy Aluminum and Aluminum Alloys ASM Handbook p. 569-580 vol. 7 Powder Metallurgy (Year: 2015).*
Recycling of Aluminum ASM Handbook, vol. 2A, Aluminum Science and Technology DOI: 10.31399/asm.hb.v02a.a0006484 (Year: 2018).*
Rijesh et al. Effect of Milling Time on Production of Aluminium Nanoparticle by High Energy Ball Milling, International Journal of Mechanical Engineering and Technology, 9(8), 2018, pp. 646-652 (Year: 2018).*

(Continued)

*Primary Examiner* — Alexandra M Moore
(74) *Attorney, Agent, or Firm* — Nath, Goldberg & Meyer; Joshua B. Goldberg

(57) ABSTRACT

A method of forming nanoparticles from aluminum cans is provided, wherein the nanoparticles may be used to fabricate effervescent tablet for suspension production. The method includes collecting, cleaning, and drying aluminum cans; shredding and melting the aluminum cans and forming the melted aluminum cans into small parts; milling the small parts into a powder; sieving the powder to obtain a sieved powder; and ball milling the sieved powder to obtain nanoparticles. The particles may then be mixed with effervescent agents and surfactant and pressed to form the effervescent tablet. The effervescent tablet may be added to water to produce the suspension.

17 Claims, 8 Drawing Sheets

(56) References Cited

OTHER PUBLICATIONS

He Mingqian Belinda Analysis of the Recycling Method for Aluminum Soda Cans. University of Southern Queensland Faculty of Engineering and Surveying (Year: 2006).*

The Wayback Machine "What is Recycling? Recycling 101" Waste Management (Year: 2020).*

Nduni, et al.; "Synthesis and characterization of aluminium oxide nanoparticles from waste aluminium foil and potential application in aluminium-ion cell." Cleaner Engineering and Technology 3 (2021): 100108.

Samy, et al.; "Structural, Morphological, Optical, Thermal and Fungicidal Effects of Gamma Aluminum Nanoparticles Synthesized from Pepsi Cans." (2021). DOI: https://doi.org/10.21203/rs.3.rs-1127052/v1.

Tun, et al.; "Synthesis and Characterization of Nano Aluminium Oxide From Waste Aluminium Cans." J. Myanmar Acad. Arts Sci. 2023 vol. XXI. No. 1.

* cited by examiner

Al-alloy-based suspensions

1.0 vol.%　　　0.5 vol.%　　　0.1 vol.%

ALUMINUM ALLOY-BASED EFFERVESCENT TABLET FOR PRODUCING ENHANCED HEAT TRANSFER SUSPENSIONS

BACKGROUND OF THE INVENTION

Field of the Invention

The disclosure of the present patent application relates to heat transfer suspensions and, particularly, to an aluminum alloy-based effervescent tablet for producing heat transfer suspensions.

Description of Related Art

Waste is widely recognized as a by-product of daily activities and social behavior. For centuries, waste materials have been regarded as undesired substances requiring disposal after their primary use. Managing solid waste (SW) is a difficult and expensive process, often requiring special prolonged procedures that consume both time and energy. Today, however, there are significant concerns about the recycling and recovery of the waste, particularly aluminum solid waste (ASW). Within the framework of integrated solid waste management (ISWM) at the national level, the concept of circular economy (CE) has become a vital issue for sustainable development. The generation of SW, in particular ASW, is associated with societal comfort level, gross domestic product (GDP) index, population, and urbanization. These factors have led to an alarmingly high estimated rate of ASW per capita generation, and an overwhelming volume of aluminum (Al) waste transported via waterways, potentially reaching millions of tons per day. Countries within the Organization for Economic Cooperation and Development (OECD) have the highest waste generation rates with an average of 2.2 kg per capita per day and retaining 44% of global estimates. Small and developing island nations have been identified as the highest producers of waste globally. The State of Kuwait, a small developing country, has a recent waste generation estimate of 5.7 kg per capita per day, ranking first worldwide. Metallic SW, which includes aluminum waste, makes up about 3% of the municipal solid waste (MSW) generated in Kuwait. This corresponds to over 30,000 million tons of metallic SW generated annually.

Since aluminum is a sustainable material, recycling ASW can be beneficial in saving mineral sources and energy for primary aluminum product production, such as aluminum particles. One way of reusing aluminum is by forming nanoparticles for use in heat suspension solutions. One of the main challenges that faces the production of suspensions is the complicated fabrication process requiring complicated equipment, high handling experience, and lots of time.

Thus, new methods of recycling of aluminum cans that provide useful products are desirable.

SUMMARY OF THE INVENTION

The present disclosure relates to a method of forming nanoparticles from aluminum cans. The method includes collecting, cleaning, and drying aluminum cans; shredding and melting the aluminum cans and forming the melted aluminum cans into small parts; milling the small parts into a powder; sieving the powder to obtain a sieved powder; and ball milling the sieved powder to obtain nanoparticles.

The present disclosure also relates to a method of forming an effervescent tablets using the aluminum nanoparticles described herein. The method includes adding sodium dodecylbenzenesulfonate (SDBS), sodium bicarbonate, and citric acid to obtain a powder; and forming the powder into an effervescent tablet.

Another embodiment includes a method of forming a colloidal suspension using the effervescent tablet described. The method includes adding the effervescent tablet to water.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Definitions

Figures 1A, 1B, 1C, 1D, 1E, 1F:
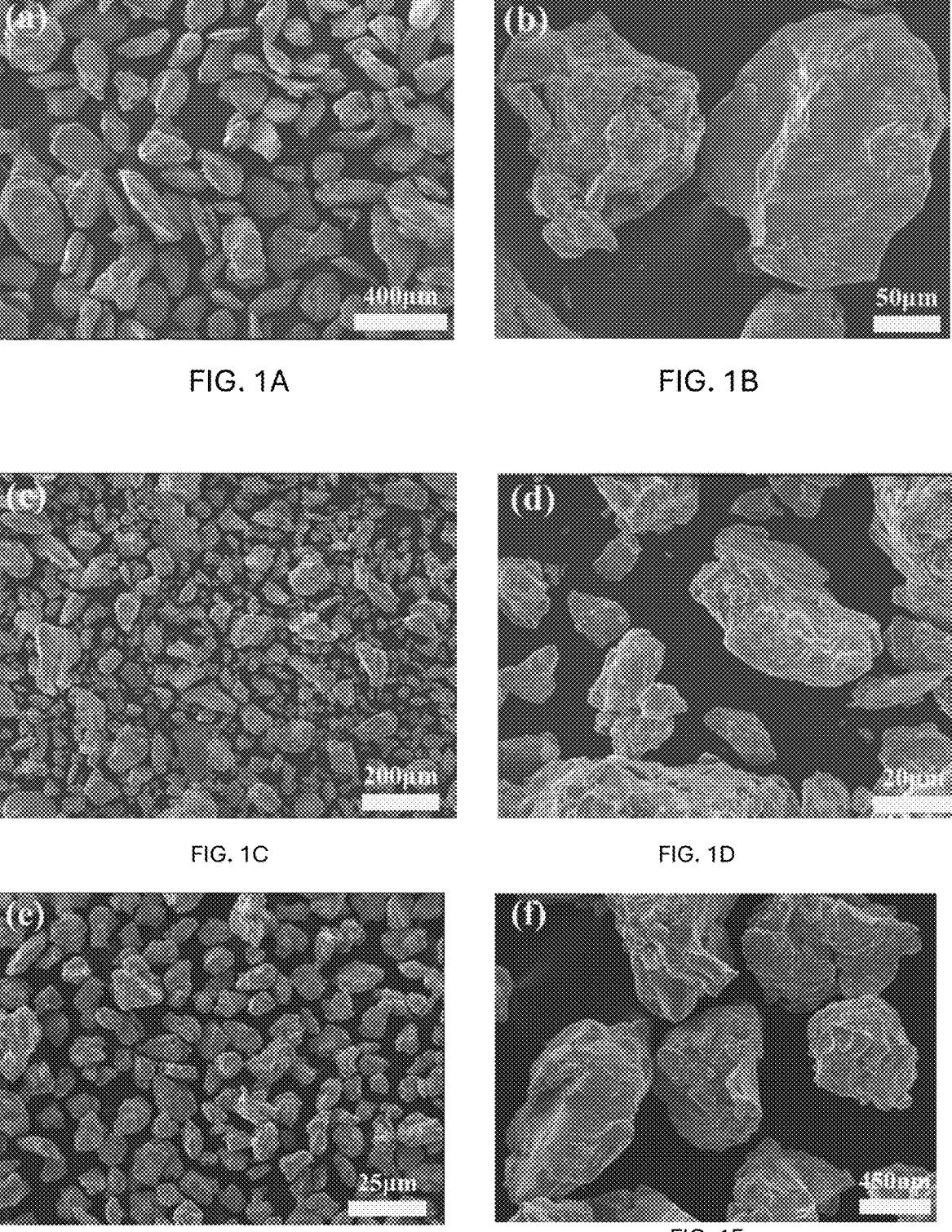
FIGS. 1A-1F illustrate SEM characterization of the milled feedstock, where the morphological structure and size of the particles are shown after disk milling (FIGS. 1A-1B), sieving (FIGS. 1C-1D), and ball milling (FIGS. 1E-1F).

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure relates to a method of forming nanoparticles from aluminum cans. The method includes cleaning and drying aluminum cans; shredding and melting the aluminum cans and forming the melted aluminum cans into small parts; milling the small parts into a powder; sieving the powder to obtain a sieved powder; and ball milling the sieved powder to obtain nanoparticles. In some embodiments, the small parts may include circles sliced from a cylinder, the circles may also be cut into pie shaped pieces making up a fourth of the circles.

In various embodiments, the cans may be drinking cans.

In some embodiments, milling the small parts into a powder may include disc milling the small parts at a speed of at least about 1,500 rpm for at least about 3 hours, at least 3 hours, or about 3 hours.

In other embodiments, sieving the powder may include sieving the powder for at least about 5 minutes, at least 5 minutes, or about 5 minutes.

In still other embodiments, sieving the powder may include using a sieve shaker equipped with two sieves. In some embodiments, the two sieve shakers may have a mesh size of 63 µm for a top sieve and 45 µm for a bottom sieve.

In various embodiments, ball milling may include milling the sieved powder in about 5 g batches in a ball milling device.

In some embodiments, sieved powder may be ball milled in a vial having a 5.5 cm height and a 7.5 cm diameter.

In another embodiment, the ball milling device may have a ball to powder weight ratio of 43.73:1.

In other embodiments, ball milling may include using 10 mm stainless steel diameter balls.

In still other embodiments, the ball milling device may be operated at 400 rpm for 72 hours, with about a 10 minute stop for each 10 minutes of running time.

In various embodiments, the nanoparticles may contain metals selected from the group consisting of Al, Cr, Cu, Fe, Mg, Mn, Ni, Si, Ti, Zn, and Zr.

An embodiment includes a method of forming effervescent tablets using the described nanoparticles. The method may include adding sodium dodecylbenzenesulfonate (SDBS), sodium bicarbonate, and citric acid to obtain a powder; and forming the powder into an effervescent tablet.

In various embodiments, the powder may be formed into an effervescent tablet using a press. In some embodiments, press may form tablets having an inner diameter of 25 mm. In other words, the tablets may be formed using a dye having an inner diameter of 25 mm.

In another embodiment, the weight ratio of SDBS, nanoparticles, sodium bicarbonate, and citric acid may be 0.13:1:2.29:3, respectively.

Another embodiment includes a method of forming a colloidal suspension using an embodiment of an effervescent tablet described herein. The method may include adding the effervescent tablet to water.

In various embodiments, the colloidal suspension may be used in heat transfer applications.

Dispersing aluminum particles synthesized from ASW into a base fluid may improve the overall (or effective) thermal characteristics of the suspension. The improvement may occur because the dispersed particles typically exhibit higher thermal conductivity compared to their host liquid. For instance, the thermal conductivity of aluminum particles is approximately 225.5 W/m·K at room temperature, whereas that of water is only 0.608 W/m·K. Therefore, recycling ASW and utilizing it to form suspensions, which can be employed as working fluids, may improve the thermal efficiency of heat transfer applications. These include, by non-limiting example, heat exchangers, solar collectors, liquid cooled computers, among others. Furthermore, soda and drinking cans are made mostly from aluminum. However, the outer coating layer consists of different percentages of other elements, which depend mainly on the manufacturer. An example of the elements that can be found in the coating layer includes Cr, Cu, Fe, Mg, Mn, Ni, Si, Ti, Zn, and Zr. Given that elements such as Cu has higher thermal conductivity than Al (i.e., Cu: 401 W/m·K, and Al: 225.5 W/m·K), thus forming alloy-based particles from the soda can while including its coating layer may provide a further enhanced thermal property.

Aluminum forms the majority of the elements, and it is soft and acts like clay. The partial elements, such as magnesium, zinc, and copper, have a similar behavior to that of aluminum in terms of being soft and acting like clay. However, each of these elements varies in their hardness value. For example, the hardness of magnesium, zinc, aluminum, and copper has a value of ~1-2.5 Mohs, ~2.5 Mohs, ~2.75 Mohs, and ~3 Mohs, respectively.

The principles described may be further described using various examples.

EXAMPLES

One of the main challenges that faces the production of suspensions is the complicated fabrication process, which requires complicated equipment, high handling experience, and is time consuming. As such, in 2023 and 2024, Ali et al. Ali et al., "Effervescent tablets for carbon-based nanofluids production," Journal of Molecular Liquids, 390(B): 123083 (2023)) and Alsayegh et al. (U.S. Pat. No. 11,866,610 B2) have developed a new method to overcome the obstacles that were associated with the conventional suspension preparation method. Their method relied on the use of effervescent tablet technology, where the released gas from the effervescent agent's reaction acts as a driving force towards dispersing the accompanied particles within the base fluid, and thus forming the suspension. In comparison with the traditional suspension fabrication approach, the effervescent tablet-based method provides the following advantages:

a. Effervescent tablets eliminate the need for bulky equipment-users simply dissolve the tablet in the fluid, making it portable and user-friendly.

b. Effervescence accelerates nanoparticle dispersion through gas bubble agitation, ensuring uniform mixing.

c. Reduces preparation time compared to sonication or high-shear mixing.

d. Tablets are pre-measured, ensuring consistent nanoparticle concentration in each batch; whereas conventional methods often suffer from batch-to-batch variability due to manual measurement errors.

e. Conventional nanofluid synthesis requires high-energy sonication or mechanical stirring. The effervescent method eliminates the need for external energy input, reducing costs and environmental impact.

f. Particles in dry tablet form reduce exposure risks associated with handling raw powders. Conventional methods involve direct handling of particles, which can lead to health hazards from inhalation.

g. Easier to scale up for industrial applications due to pre-packaged and easy-to-use format.

h. Ideal for on-site preparation without specialized laboratory equipment.

i. Allows for custom formulations by incorporating multiple particle types, surfactants, and additives in a single tablet.

j. Reduces the need for separate chemical processing for multi-particle suspensions Therefore, when combining the effervescent tablet technology with particles made of recycled soda cans that include their coating layer, an advanced form of thermal suspension can be formed and used for many heat transfer applications. However, due to the tendency of the different elements for absorbing $CO_2$ gas, an accurate calculation of the effervescent agents that takes into account this factor is required. For example, Mg and Zn have high $CO_2$ absorption, Fe and Mn have moderate $CO_2$ absorption, and Al, Cr, Cu, Ni, Si, Ti, and Zr have low $CO_2$ absorption.

This approach described may solve the following aspects: It may provide an innovative way to recycle soda cans, including coating layers, into functional materials instead of discarding them as waste. It may develop a method to transform aluminum alloy waste into particles with controlled morphology and positive surface charge, and thus ensuring better dispersion in water. It may introduce effervescent tablets as a novel approach to disperse nanoparticles in a liquid medium, eliminating the need for external mixing or stabilizers. The resulting suspensions may exhibit good dispersion stability with a significantly enhanced thermal conductivity of up to ~77.5% (depending on the vol. % used), making them attractive for heat transfer applications. This approach may allow for scalable and cost-effective product from recycled materials or other similar ones.

Improvements over any existing method for solving the same problems include: The method may provide a new route for recycling aluminum waste. Unlike conventional methods that rely on commercially prepared particles, this approach utilizes recycled soda cans, making it more sustainable and cost-effective. The Al-alloy-based effervescent tablets described herein not only generate a suspension but also ensures proper dispersion of particles using in-situ $CO_2$ generation, eliminating the need for additional stabilizing agents. The precise stoichiometric balance between citric acid and sodium bicarbonate and the selected weight ratio between the effervescent agents and particles is determined to generate $CO_2$ in sufficient amounts, ensuring well-dispersed and stable suspensions with low levels of agglomeration. The developed suspensions show a promising enhancement in thermal conductivity (ranging from −5% to ~77.5%), making them effective for heat transfer applications. While the study focuses on recycled aluminum cans, the method can be adaptable for commercial powders with similar elemental compositions, providing flexibility to the manufacturer. This method can be seen as an environmentally friendly approach since it helps in solving the cumulative amount of aluminum waste and transferring it into useful products.

Given the above, an Al-alloy-based effervescent tablet is introduced to produce heat transfer suspensions from recycled soda cans with their coating layers. To achieve this, waste soda cans of four brands (i.e., Pepsi Cola®, Coca-Cola®, Fanta®, and Sprite®) (Pepsi Cola® is a registered trademark of PepsiCo, Inc. of Harrison, NY, USA; Coca-Cola®, Fanta®, and Sprite® are all registered trademarks of The Coca Cola Company of Atlanta, Georgia, USA) were collected, cleaned, and dried.

Then they were shredded, melted, and molded into small parts. Specifically, the molten aluminum was molded first in a cylindrical shape (3 cm (diameter)×25 cm (length)) then cut to smaller cylindrical shapes (3 cm (diameter)×2.5 cm (thickness)). These smaller cylindrical shapes were then cut into 4 quarters. The as-molded molten was then milled using a disc milling machine at 1,500 rpm and for 3 hours.

The as-milled powder was then placed in a sieve shaker for 5 minutes. The sieve shaker was equipped with two sieves, with mesh sizes of 63 μm for the top and 45 μm for the bottom. The as-sieved powder was then collected from the 45 μm sieve and placed in a high energy ball milling device in a 5 g patch. Furthermore, the high energy ball milling device used vials having a size of 5.5 cm (height)× 7.5 cm (diameter), and the ball-to-powder weight ratio of 43.73:1. The balls used were 10 mm in diameter and are made of stainless-steel. In addition, the high energy ball milling device operated at 400 rpm for 72 hours, with a 10-minute stop for each 10 minute of running time. This was done to prevent the heat build-up within the vial, and hence the attachment of the material to the milling balls and/or inner vial surface.

The particles produced from the disc milling machine were flake-like in shape and had a micrometer scale, whereas the high energy ball milling device causes the particles to change their morphology to spherical and reduces their size to the nanoscale. The SEM analysis shows the previous changes in particles' scale and shape (FIG. 1).

Next, an X-ray fluorescence (XRF) analysis was conducted to determine the elemental content of the powder, where the results are shown in Table 1.

TABLE 1

Elemental content for each type of feed based on the XRF analysis.

| | Feed source | | | | | | |
|---|---|---|---|---|---|---|---|
| Element | Pepsi ® content (%) | Coca-Cola ® content (%) | Fanta ® content (%) | Sprite ® content (%) | Min. content (%) | Avg. content (%) | Max. content (%) |
| Al | 92.68 | 94.41 | 95.66 | 94.9 | 92.68 | 94.413 | 95.66 |
| Cr | 0.03 | 0.03 | 0.02 | 0.02 | 0.02 | 0.025 | 0.03 |
| Cu | 0.33 | 0.27 | 0.34 | 0.26 | 0.26 | 0.300 | 0.34 |
| Fe | 2.03 | 0.69 | 0.6 | 1.04 | 0.6 | 1.090 | 2.03 |
| Mg | 1.03 | 1.53 | 1.61 | 1.63 | 1.03 | 1.450 | 1.63 |
| Mr | 1.19 | 1.18 | 1.16 | 1.24 | 1.16 | 1.193 | 1.24 |
| Ni | 0.01 | 0.01 | 0.01 | 0 | 0 | 0.008 | 0.01 |
| Si | 0.48 | 0.41 | 0.46 | 0.73 | 0.41 | 0.520 | 0.73 |
| Ti | 0.07 | 0.11 | 0.03 | 0.05 | 0.03 | 0.065 | 0.11 |
| Zn | 0.03 | 0.14 | 0.09 | 0.11 | 0.03 | 0.093 | 0.14 |
| Zr | 0 | 0.01 | 0 | 0 | 0 | 0.003 | 0.01 |

From the XRF elemental analysis, it can be concluded that the composition would provide a powder with a positive overall surface charge (Table 2). This is mainly because the feed is predominantly aluminum (92.68%-95.66%), which forms alumina ($Al_2O_3$) in water. Alumina has an isoelectric point (IEP) around pH 8-9, resulting in a positive surface charge in neutral water (pH ~7). For ensuring a well dispersion of the particles in water, the effervescent agents used should maintain a positive surface charge once dissolved in water. Otherwise, the dispersed particles would rapidly cluster with each other, resulting in the suspension being physically unstable due to particles separation from the basefluid. As such, citric acid ($C_6H_8O_7$) and sodium bicarbonate ($NaHCO_3$) were selected as the effervescent agents in forming the effervescent tablets. The following approach was used to determine the weight ratio between the particles, citric acid, and sodium bicarbonate in the effervescent tablet content.

TABLE 2

Surface charge of each element in water of 25° C. and pH 7 according to their oxide forms and isoelectric points (IEPs).

| Element | Oxide form | IEP range | Surface charge at water of pH 7 |
|---|---|---|---|
| Al | $Al_2O_3$ | 8-9 | Positive |
| Cr | $Cr_2O_3$ | 6-7 | Neutral/Slightly Negative |

8

TABLE 2-continued

Surface charge of each element in water of 25° C. and pH 7 according to their oxide forms and isoelectric points (IEPs).

| Element | Oxide form | IEP range | Surface charge at water of pH 7 |
|---|---|---|---|
| Cu | CuO | 9-10 | Positive |
| Fe | $Fe_2O_3$ | 6-8 | Neutral/Slightly Negative |
| Mg | MgO | ~12 | Positive |
| Mn | $MnO_2$ | 4-5 | Negative |
| Ni | NiO | 10-11 | Positive |
| Si | $SiO_2$ | 2-3 | Negative |
| Ti | $TiO_2$ | 5-6 | Negative |
| Zn | ZnO | 9-10 | Positive |
| Zr | $ZrO_2$ | 4-5 | Negative |

Chemical Reaction

The chemical reaction between $C_6H_8O_7$ and $NaHCO_3$ is as follows:

$$C_6H_8O_7+3NaHCO_3 \rightarrow Na_3C_6H_5O_7+3H_2O+3CO_2\uparrow \qquad (1)$$

Conversion

For total conversion between $C_6H_8O_7$ and $NaHCO_3$, a stoichiometric ratio of 1:3 is required. Meaning that 1 mole of $C_6H_8O_7$ should be included with 3 moles of $NaHCO_3$. The weight of each mole of substance is as following:

1 mole of $C_6H_8O_7$=192.14 g 1 mole of $NaHCO_3$=84.01 g 1 mole of $CO_2$=44.01 g Therefore, 1 mole of citric acid (192.14 g) reacts with 3 moles of sodium bicarbonate (3×84.01 g=252.03 g) to produce 3 moles of carbon dioxide (3×44.01 g=132.03 g). The reaction between 1 mole of $C_6H_8O_7$ and 3 moles of $NaHCO_3$ will generate 132.03 g of $CO_2$.

The mass ratio of citric acid to sodium bicarbonate is 192.14 g:252.03 g, which simplifies to approximately 0.76:1. This means that for a complete reaction, 0.76 grams of citric acid are required per gram of sodium bicarbonate. Considering the generated amount of $CO_2$ needed to physically disperse the particles, a weight ratio of 1:2.29:3 is required for the particles, $C_6H_8O_7$, and $NaHCO_3$, respectively. Notably, lower mass ratios would not experimentally provide sufficient buoyant force to fully disperse the particles within the basefluid. Given that the particles adsorb some of the $CO_2$ gas generated (Table 3), this means that for 396.09 g of $CO_2$ generated, the particles from the different feeds would adsorb a net of 14.24% (Min.), 17.13% (Avg.), and 20.09% (Max.) of the gas. Thus, the remaining amount of $CO_2$ that causes the particles dispersion would be 339.67 g, 328.22 g, and 316.52 g for the Min., Avg., and Max. particles adsorption causes, respectively. In addition, to improve the dispersed particles stability, a weight ratio of 0.13:1 is required for the sodium dodecylbenzenesulfonate (SDBS) and particles. Thus, the final weight ratio used to fabricate the effervescent tablets is 0.13:1:2.29:3 for the SDBS, particles, $C_6H_8O_7$, and $NaHCO_3$, respectively.

TABLE 3

| | | | | | | |
|---|---|---|---|---|---|---|
| Particles $CO_2$ adsorption when dispersed in water at 25° C. | | | | | | |
| | $CO_2$ adsorption capacity (%) | | | $CO_2$ adsorption (%) based on individual contribution to feed content | | |
| Element | Min. | Avg. | Max. | Min. | Avg. | Max. |
| Al | 15 | 17.5 | 20 | 13.902 | 16.5222 | 19.132 |
| Cr | 2 | 3 | 4 | 0.0004 | 0.0008 | 0.0012 |
| Cu | 1 | 2 | 3 | 0.0026 | 0.006 | 0.0102 |
| Fe | 10 | 12.5 | 15 | 0.06 | 0.1363 | 0.3045 |
| Mg | 20 | 25 | 30 | 0.206 | 0.3625 | 0.489 |
| Mn | 5 | 6.5 | 8 | 0.058 | 0.07751 | 0.0992 |
| Ni | 8 | 10 | 12 | 0 | 0.0008 | 0.0012 |
| Si | 3 | 4 | 5 | 0.0123 | 0.0208 | 0.0365 |
| Ti | 2 | 3 | 4 | 0.0006 | 0.002 | 0.0044 |
| Zn | 4 | 5.5 | 7 | 0.0012 | 0.0051 | 0.0098 |
| Zr | 1 | 1.5 | 2 | 0 | 0.00004 | 0.0002 |

Note: The $CO_2$ adsorption (%) based on individual contribution to feed content was calculated based on the Min., Avg., and Max. values for each element shown in Table 1, using the following Eq.

$$\text{Contribution}_i = \left( \frac{\text{Element content in feed}}{100} \right) \times CO_2 \text{ Adsorption Capacity}$$

For example, when taking the Avg. content (%) of aluminum (Al) in the feed from Table 1, and its $CO_2$ adsorption capacity (%) from Table 3:

$$Al = \left( \frac{94.413}{100} \right) \times 17.5\% = 16.5222\%$$

Simulated $CO_2$ Production

Figure 2:
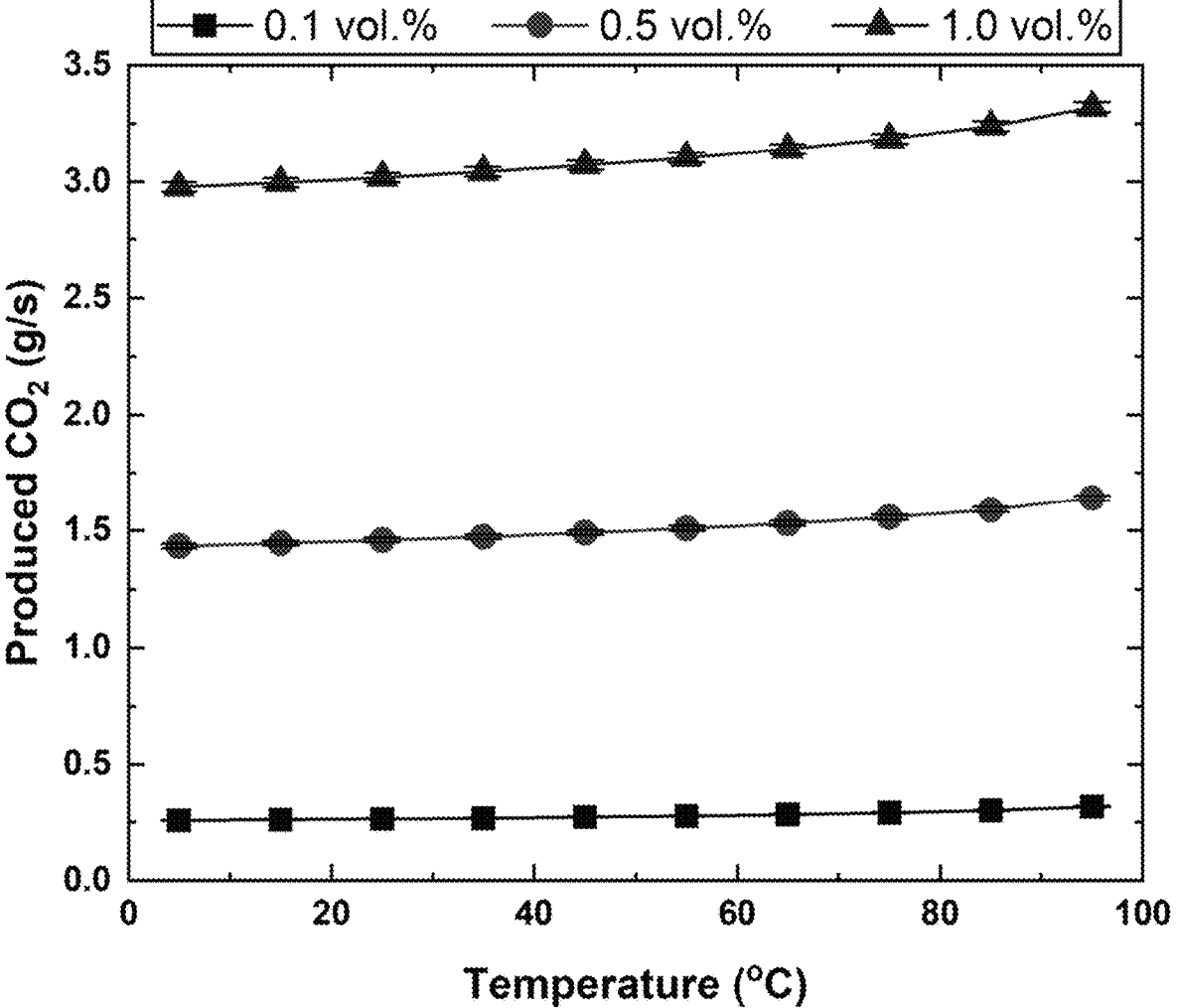
FIG. 2 is a graph showing simulated $CO_2$ production based on particle concentration and water temperature.

The produced $CO_2$ per second from the previous weight ratio (i.e., 0.13:1:2.29:3) was simulated using Aspen Plus V11 software. Furthermore, the concentrations of particles used in the simulation were 0.1 vol. %, 0.5 vol. %, and 1.0 vol. % for 80 mL of water. The simulation was performed at a temperature range of 5° C. to 95° C., with an increment of 10° C. A single equilibrium reactor configured was employed for the non-ideal liquid-phase behavior and acid-base reaction equilibrium. The feed stream comprised 80 mL of pure water together with the powder mixture. Non-ideal interactions were modeled using the Electrolyte-Non-Random Two-Liquid (NRTL)+Long-range (LR) methods. Furthermore, the LR electrostatic corrections were based on the Pizer-Debye Hukal formalism. Computed activity coefficients ($\gamma$) were used in the NRTL and LR models to fully account for both local-composition effects and ionic strength. Moreover, a temperature dependence equilibrium constant (K) was used for the activity-coefficient corrections. The previous was done to link K to the $\gamma$'s in the NRTL+LR models. The equations used to determine K are shown in Table 4, which represents the reactions involved in the simulation. The reactions involved are equilibrium reactions and their constants were determined using temperature dependent correlations. For each temperature point (at 1 atm), the reactor conditions were fixed, and the specified feed composition was processed. FIG. 2 shows the Aspen Plus simulation results in g/s. It is to be noted that the variation in the produced $CO_2$ value from the different feedstocks was found to be negligible, i.e., 0.18%-0.21% (0.1 vol. %), 0.98%-1.09% (0.5 vol. %), and 2.01%-2.18% (1.0 vol. %). Hence, the changes in $CO_2$ production were found to be caused by the particle's concentration and temperature.

TABLE 4

| | | |
|---|---|---|
| Equilibrium reactions involved in the Aspen Plus simulation along with their temperature dependent constants. | | |
| Reaction | Equilibrium constant basis | Equilibrium constant equation |
| $H_2O + CO_2 \rightleftharpoons HCO_3^- + H^+$ | $K = \frac{x_{HCO3} x_H}{x_{CO2}}$ | $\ln K = 231.465 - \frac{12092.1}{T} - 36.7816 \ln T$ |
| $HCO_3^- \rightleftharpoons CO_3^{2-} + H^+$ | $K = \frac{x_{CO3} x_H}{x_{HCO3}}$ | $\ln K = 216.05 - \frac{12431.7}{T} - 35.4819 \ln T$ |
| $C_6H_8O_7 \rightleftharpoons C_6H_7O_7^- + H^+$ | $K = \frac{(\gamma_{C6H7O7} m_{C6H7O7})(\gamma_H m_H)}{\gamma_{C6H8O7} m_{C6H8O7}}$ | $\ln K = -7.20709$ |
| $C_6H_7O_7^- \rightleftharpoons C_6H_6O_7^{2-} + H^+$ | $K = \frac{(\gamma_{C6H6O7} m_{C6H6O7})(\gamma_H m_H)}{\gamma_{C6H7O7} m_{C6H7O7}}$ | $\ln K = -10.9603$ |
| $C_6H_6O_7^{2-} \rightleftharpoons C_6H_5O_7^{3-} + H^+$ | $K = \frac{(\gamma_{C6H5O7} m_{C6H5O7})(\gamma_H m_H)}{\gamma_{C6H6O7} m_{C6H6O7}}$ | $\ln K = -14.7365$ |

Note in Table 4 $\gamma$, K, m, x, and T correspond to the activity coefficient, Equilibrium constant, Molality (mol/kg), Mole fraction, and set operation temperature (K), respectively.

Figure 3:
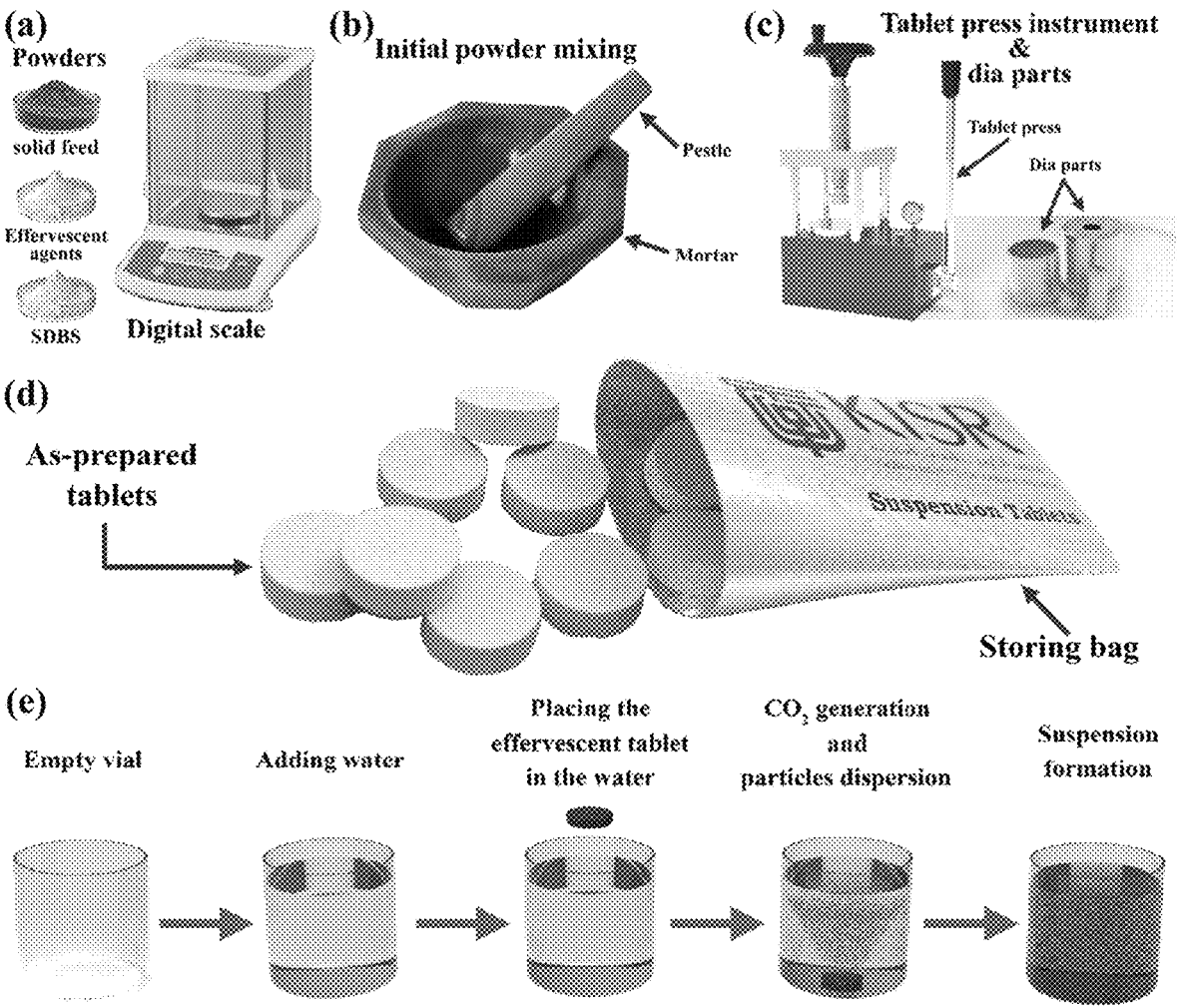
FIG. 3 is a flow chart illustrating an embodiment of effervescent tablet fabrication process and suspension production steps.
Figure 4:
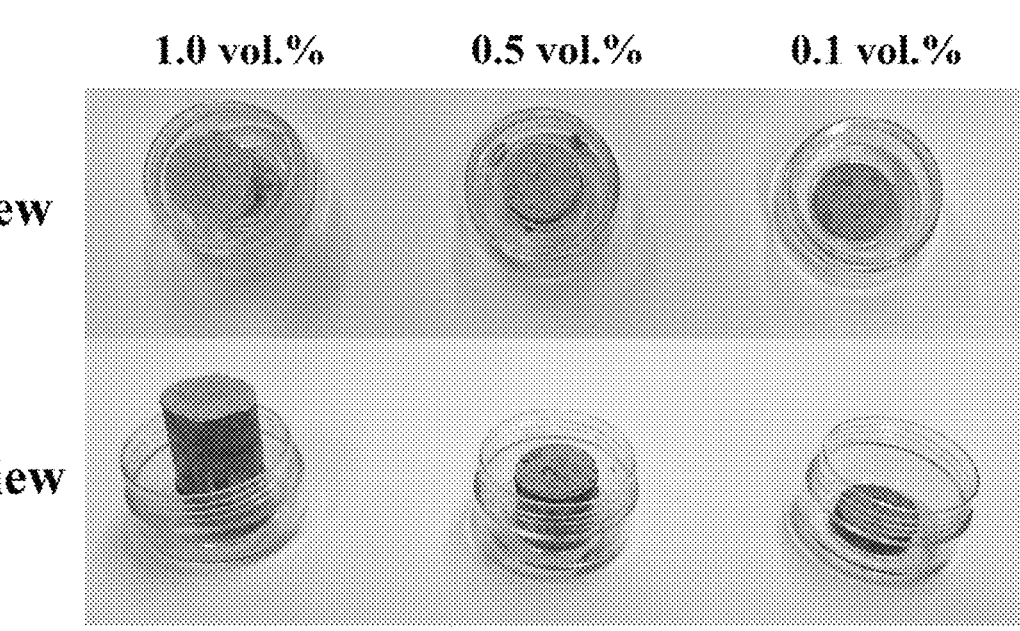
FIG. 4 illustrates an embodiment of effervescent tablets used to produce the suspensions.
Figure 5:
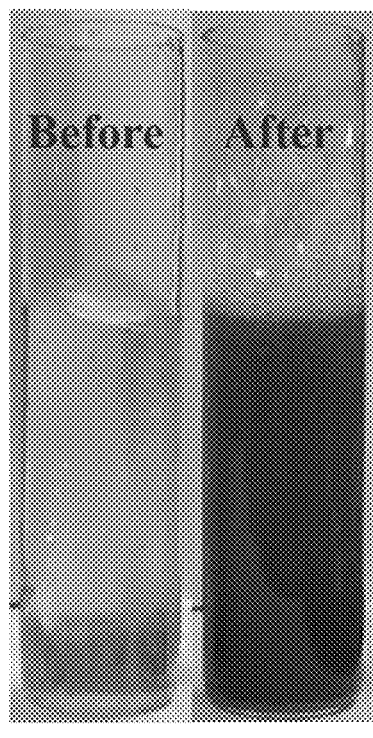
FIG. 5 illustrates examples of dispersion stability of the as-prepared suspensions showing the initial tablet reaction and final product.
Figure 5:
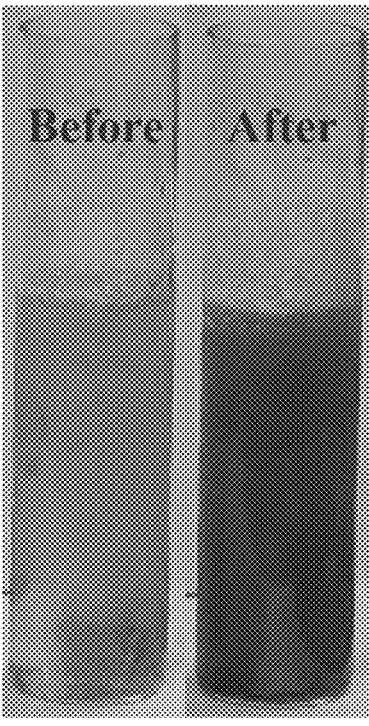
Figure 5:
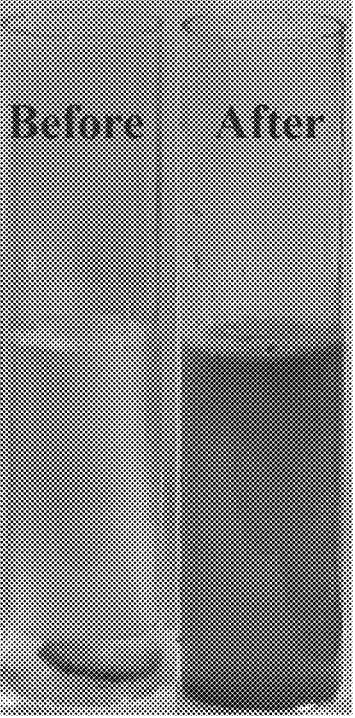
Figure 6A:
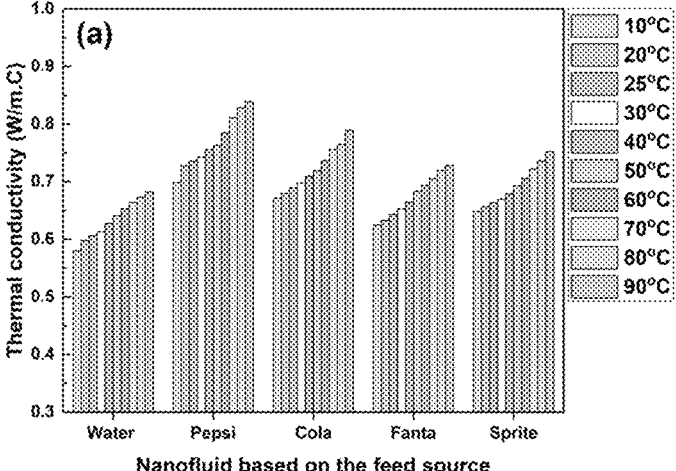
FIGS. 6A-6C are graphs illustrating thermal conductivity of the suspensions fabricated at 10° C. to 90° C. with the different feeds.
Figure 6B:
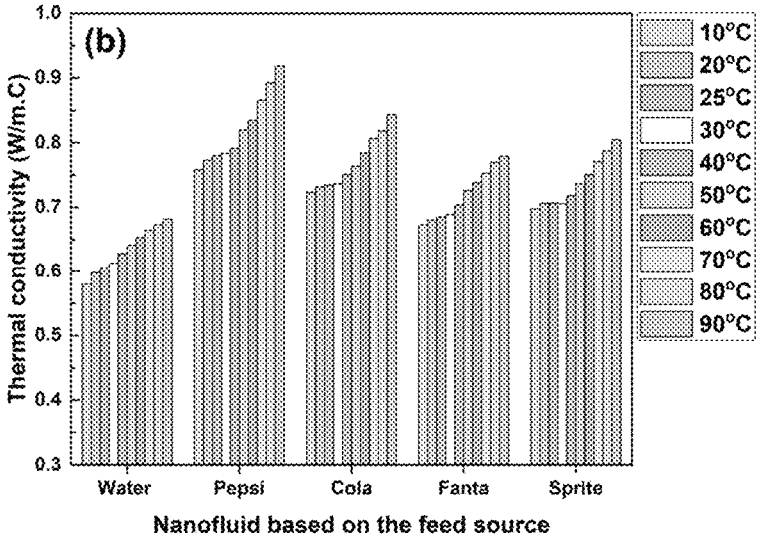
Figure 6C:
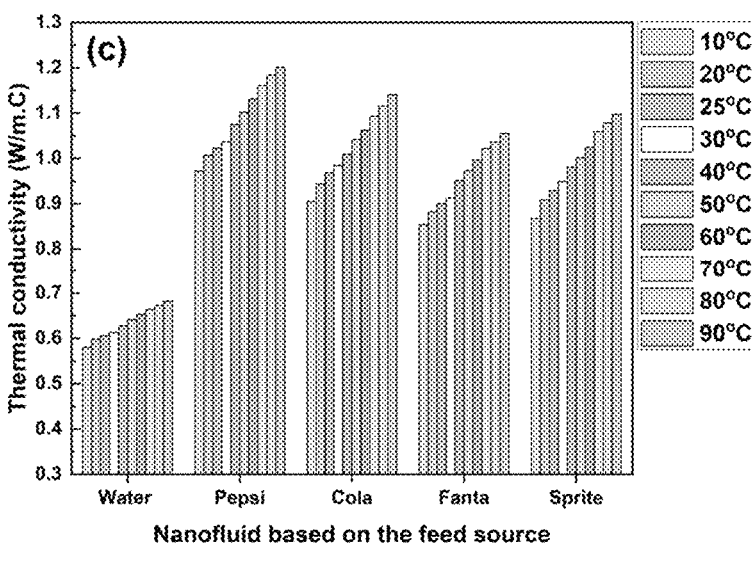
Figure 7:
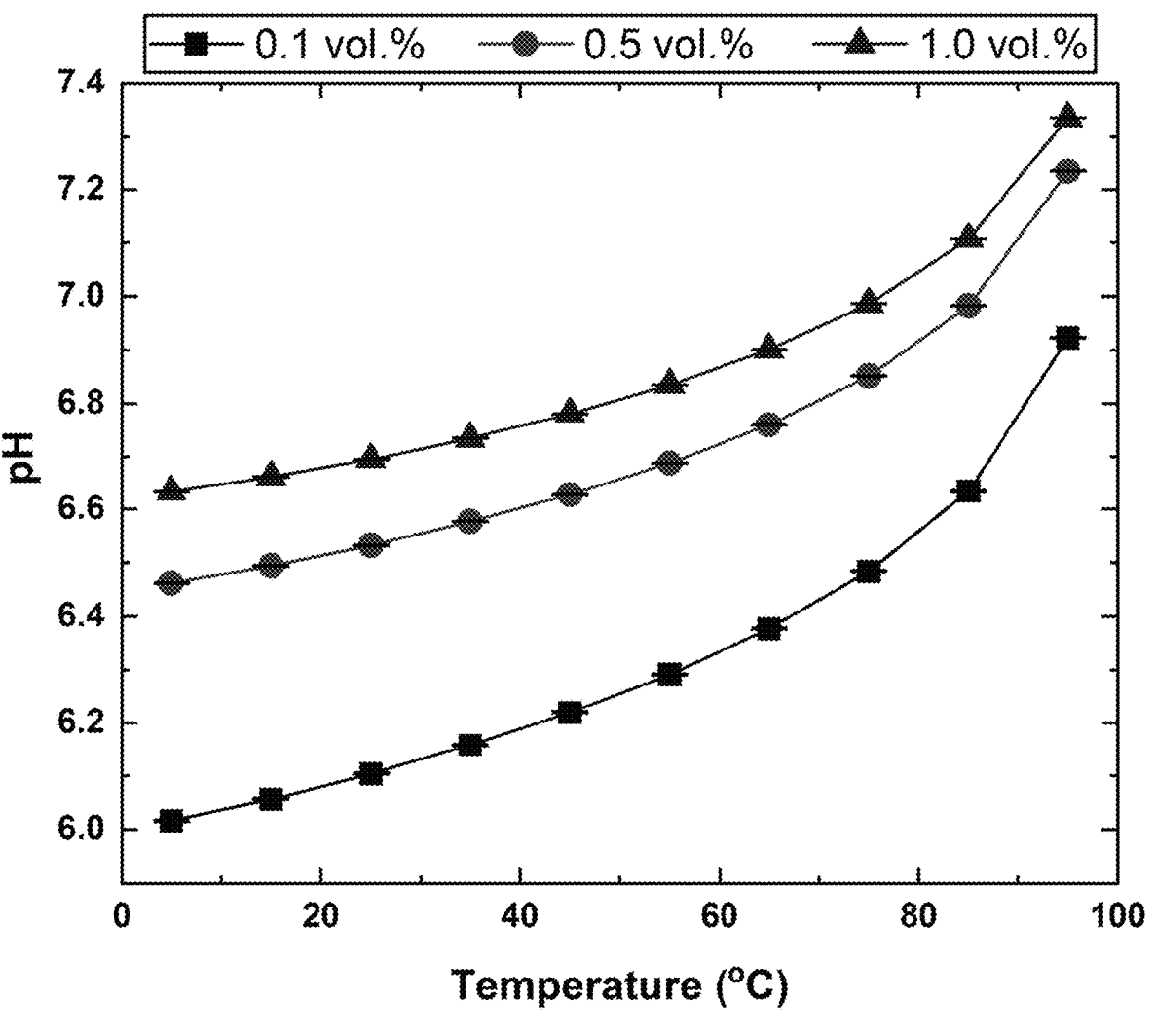
FIG. 7 is a graph illustrating changes in suspension pH based on particles concentration and water temperature.
Figure 8:
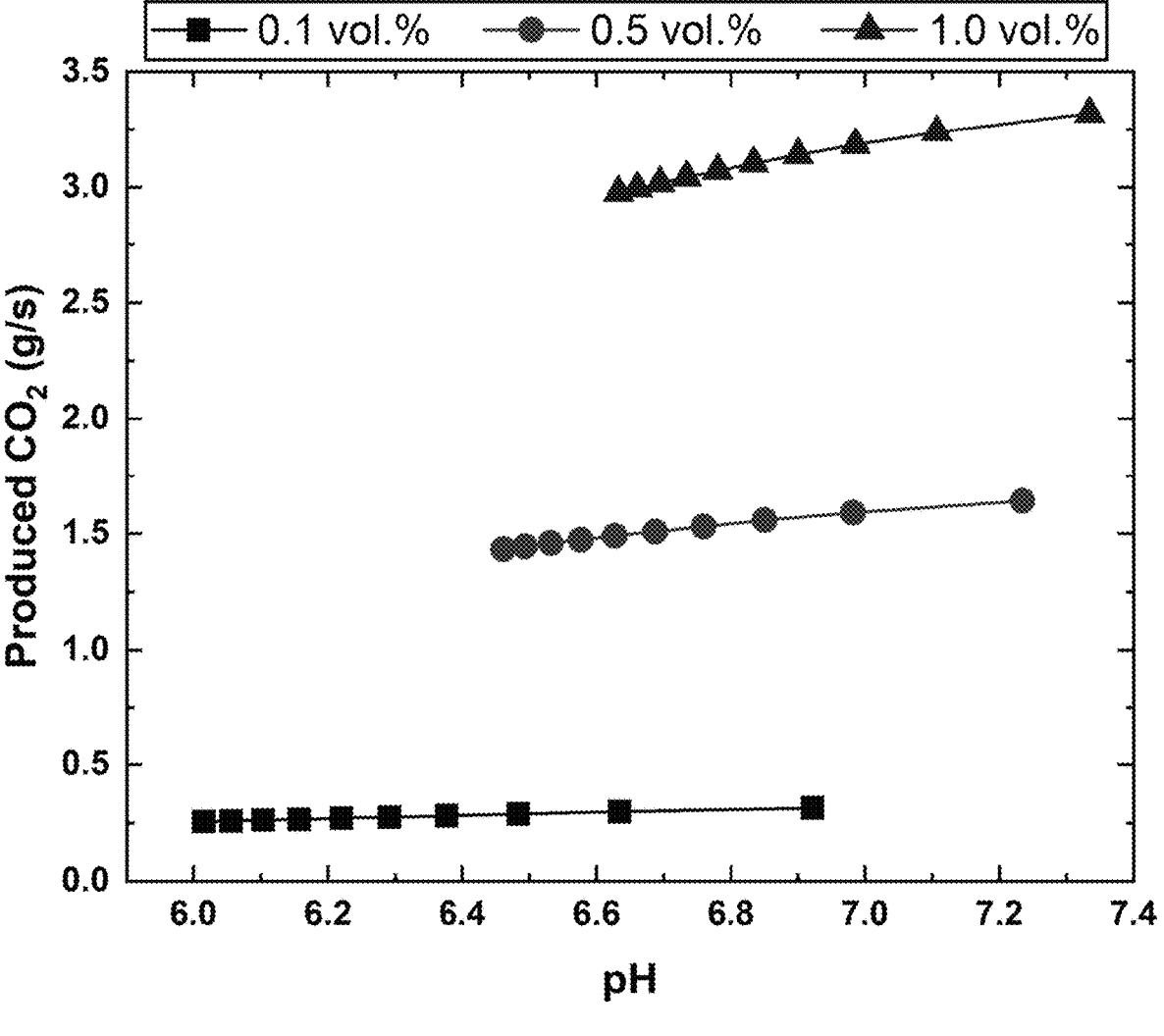
FIG. 8 is a graph illustrating changes in $CO_2$ production based on pH.

Next, the powders (based on the determined weight ratio) were hand mixed using a mortar and pestle tool. First the SDBS and particles were initially mixed together for 6 min under a controlled environment of 20° C. to about 27° C., and humidity of ~30% to ~50%. This will cause a monolayer to form on the outer particles surface. Then, the as-prepared powder is placed inside a sealed glove box containing argon gas and hand mixed with the effervescent agents. Afterwards, the powder mixture was consolidated at 100 kN using a tablet press instrument and 25 mm ID die to fabricate the effervescent tablets. The tablets were then used to form the water-based suspensions of 0.1 vol. %, 0.5 vol. %, and 1.0 vol. % by adding them to 80 mL of water. The tablet fabrication and suspension production process are shown in FIG. 3. An example of the actual effervescent tablets (i.e., 0.1 vol. %, 0.5 vol. %, and 1.0 vol. %) is shown in FIG. 4. Then, the as-prepared suspensions were examined in terms of their dispersion stability (FIG. 5) and thermal conductivity (FIG. 6) using the image capturing approach and a transient hot-wire test, respectively. The formed suspensions showed to have good physical stability, whereas the thermal conductivity of the basefluid has been found to enhance between ~5% to ~77.5%, depending on the type of feed used, dispersed particles concentration, and suspension temperature. Changes in the pH value for the feedstocks at different concentrations and temperatures were also determined, as shown in FIG. 7. The variation in pH value from the different feedstocks was found to be negligible, i.e., 0.14%-0.19% (0.1 vol. %), 0.09%-0.13% (0.5 vol. %), and 0.05%-0.1% (1.0 vol. %). The effect of dispersed particles concentration on pH and simulated $CO_2$ production is shown in FIG. 8.

It should be noted that, while we have used particles that originated from recycled soda cans, the user can come to the same result by utilizing pre-prepared particles (i.e., commercial particles) given that they represent the same elements and percentages that are shown in Table 1.

It is to be understood that the aluminum waste conversion methods and effervescent tablets described herein are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of forming effervescent tablets using nanoparticles from aluminum cans, the method comprising:
   collecting, cleaning, and drying aluminum cans having an outer coating layer, the outer coating layer including iron and at least one element selected from the group consisting of Cr, Cu, Me, Mn, Ni, Si, Ti, Zn, and Zr;
   shredding and melting the aluminum cans and forming the melted aluminum cans into parts;
   milling the parts into a powder;
   sieving the powder to obtain a sieved powder; and
   ball milling the sieved powder to obtain nanoparticles, the nanoparticles including aluminum, iron, and at least one metal selected from the group consisting of Cr, Cu, Me, Mn, Ni, Si, Ti, Zn, and Zr;
   adding sodium dodecylbenzenesulfonate (SDBS), sodium bicarbonate, and citric acid to the nanoparticles to obtain a powder; and
   forming the powder into an effervescent tablet.

2. The method of claim 1, wherein the cans are drinking cans.

3. The method of claim 1, wherein milling the parts into a powder comprises disc milling the parts at 1,500 rpm for at least about 3 hours.

4. The method of claim 1, wherein sieving the powder comprises sieving for 5 minutes.

5. The method of claim 1, wherein when sieving the powder, a sieve shaker equipped with two sieves is used.

6. The method of claim 5, wherein the two sieves have a mesh size of 63 µm for a top sieve and 45 µm for a bottom sieve.

7. The method of claim 1, wherein ball milling comprises milling the sieved powder in 5 g batches in a ball milling device.

8. The method of claim 1, wherein sieved powder is ball milled in a vial having a 5.5 cm height and a 7.5 cm diameter.

9. The method of claim 8, wherein ball milling includes using 10 mm stainless steel diameter balls.

10. The method of claim 9, wherein in the ball milling device comprises a ball to powder weight ratio of 43.73:1.

11. The method of claim 8, wherein the ball milling device is operated at 400 rpm for 72 hours, with a 10-minute stop for each 10 minutes of running time.

12. The method of claim 1, wherein the powder has an aluminum content ranging from about 92.68% to about 95.66%.

13. The method of claim 1, wherein the powder is formed into an effervescent tablet using a press.

14. The method of claim 13, the press forms tablets having an inner diameter of 25 mm.

15. The method of claim 1, wherein the weight ratio of SDBS, nanoparticles, sodium bicarbonate, and citric acid is 0.13:1:2.29:3, respectively.

16. A method of forming a colloidal suspension, the method comprising:
   collecting, cleaning, and drying aluminum cans;
   shredding and melting the aluminum cans and forming the melted aluminum cans into parts;
   milling the parts into a powder;
   sieving the powder to obtain a sieved powder; and
   ball milling the sieved powder to obtain nanoparticles having an outer coating layer including iron and at least one element selected from the group consisting of Cr, Cu, Mg, Mn, Ni, Si, Ti, Zn, and Zr;
   adding sodium dodecylbenzenesulfonate (SDBS), sodium bicarbonate, and citric acid to the nanoparticles to obtain a powder;
   forming the powder into an effervescent tablet; and
   adding the effervescent tablet to water.

17. The method of claim 16, wherein the colloidal suspension is used in heat transfer applications.

* * * * *